United States Patent Office 2,762,431
Patented Sept. 11, 1956

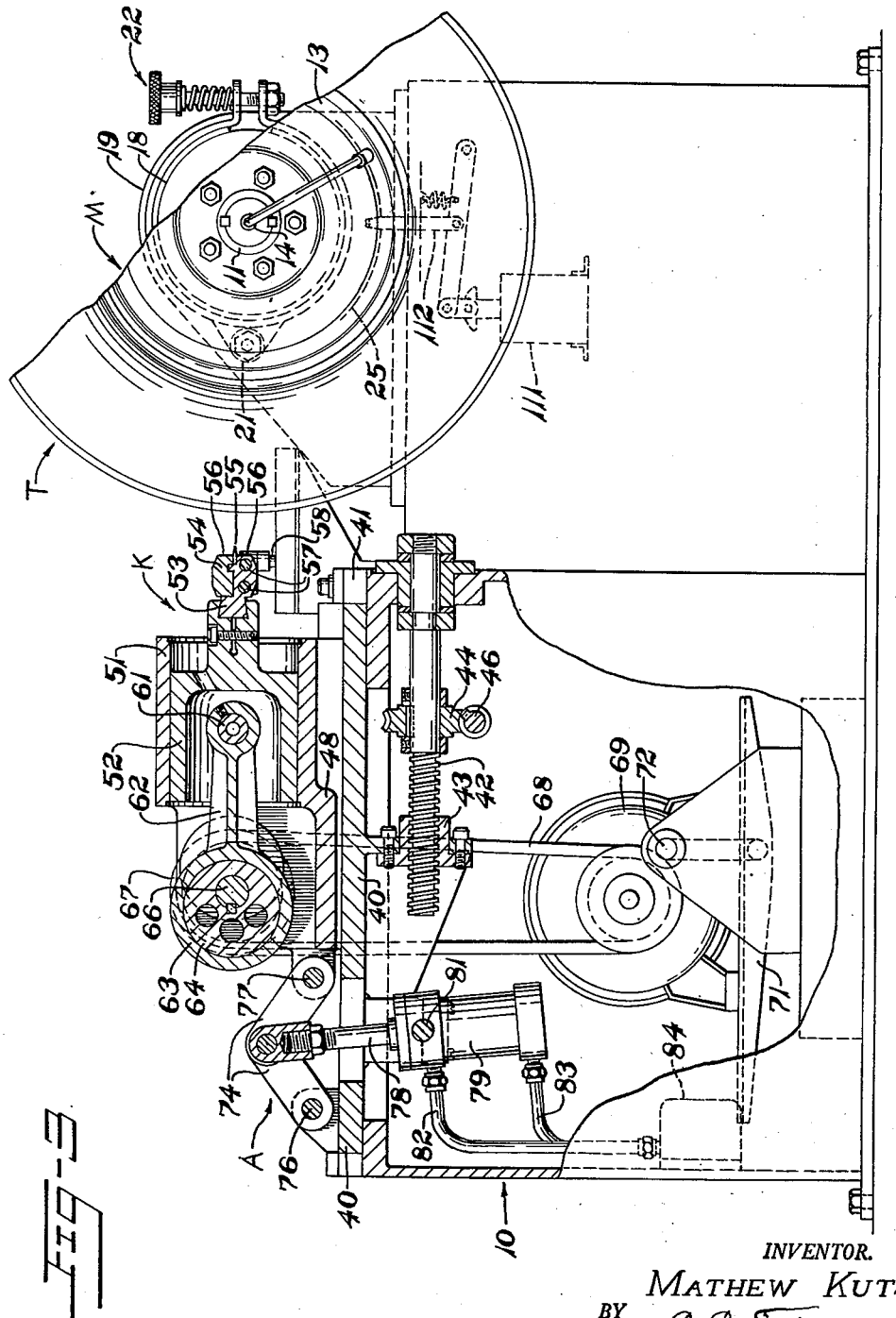

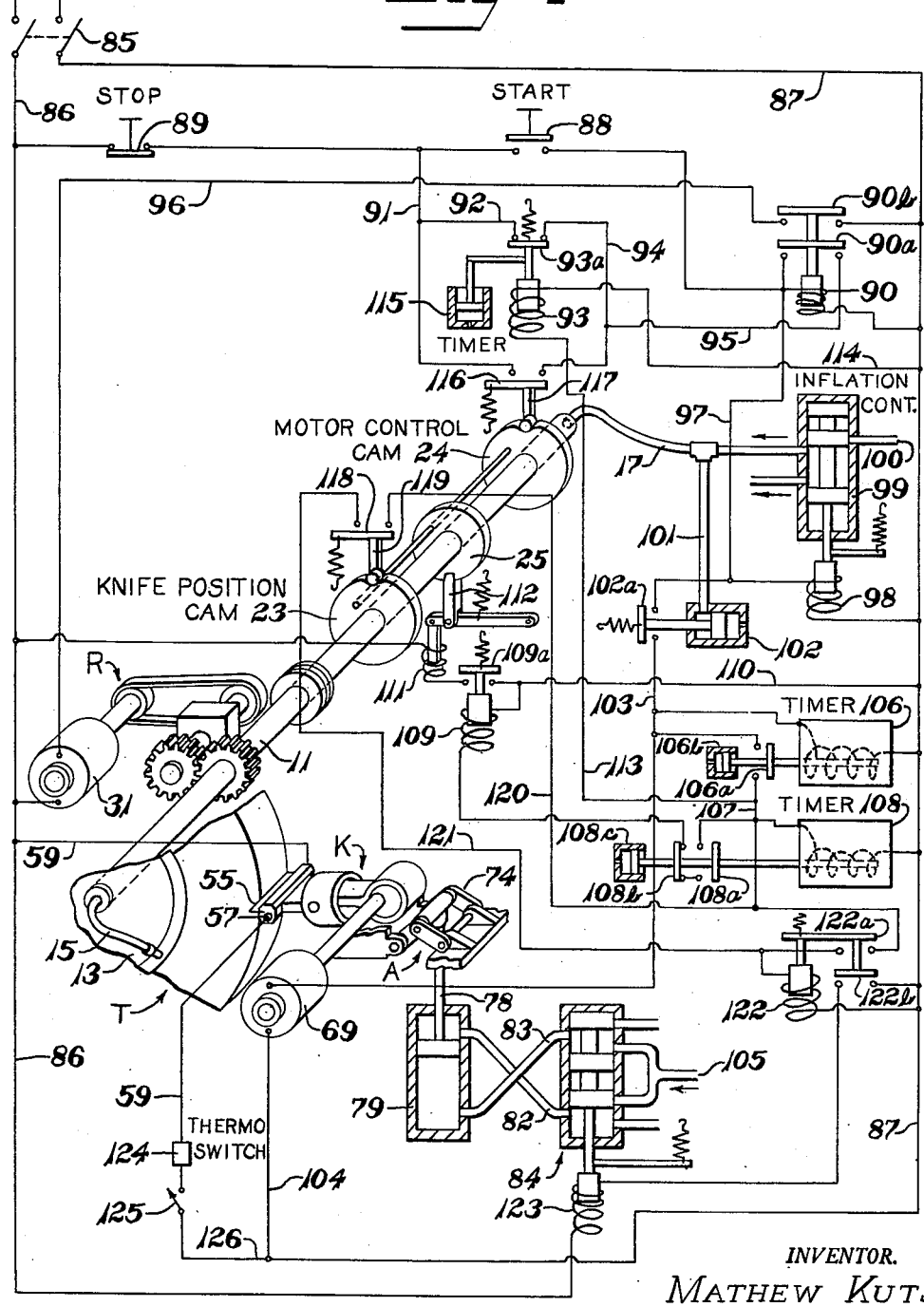

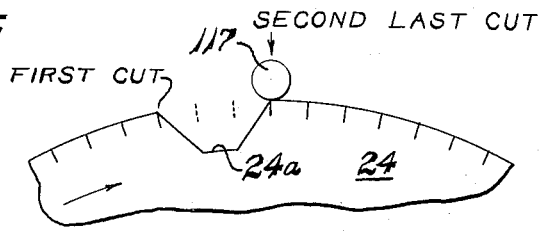
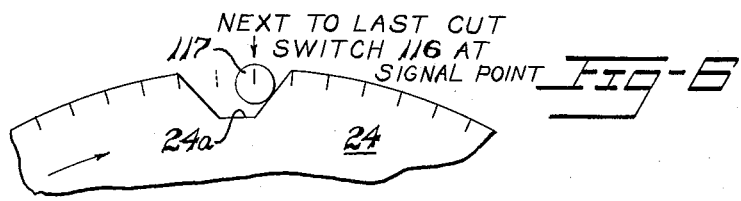
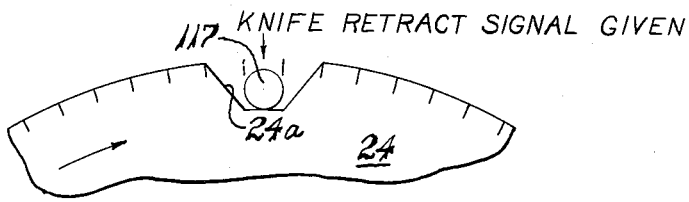
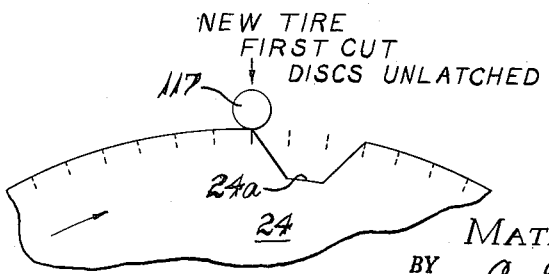

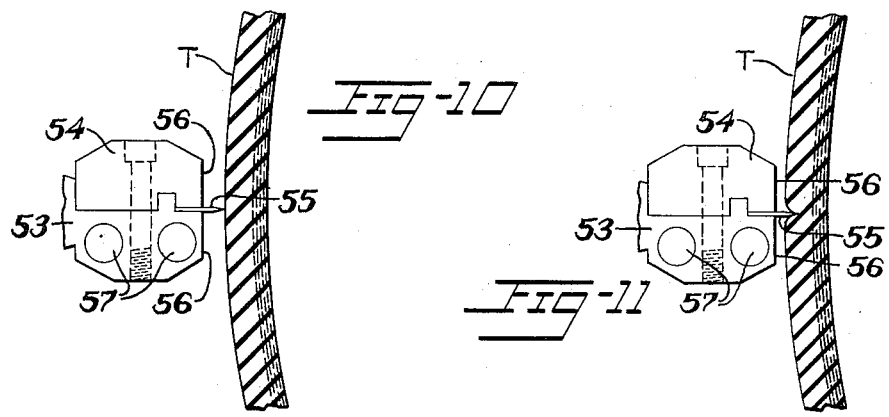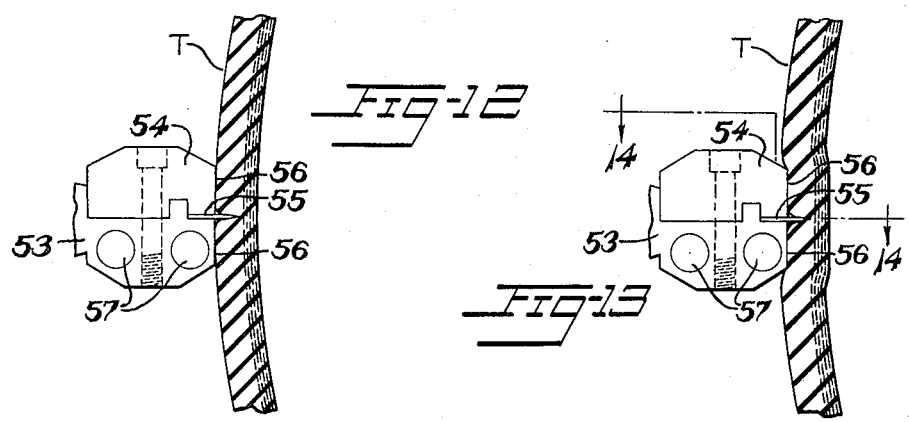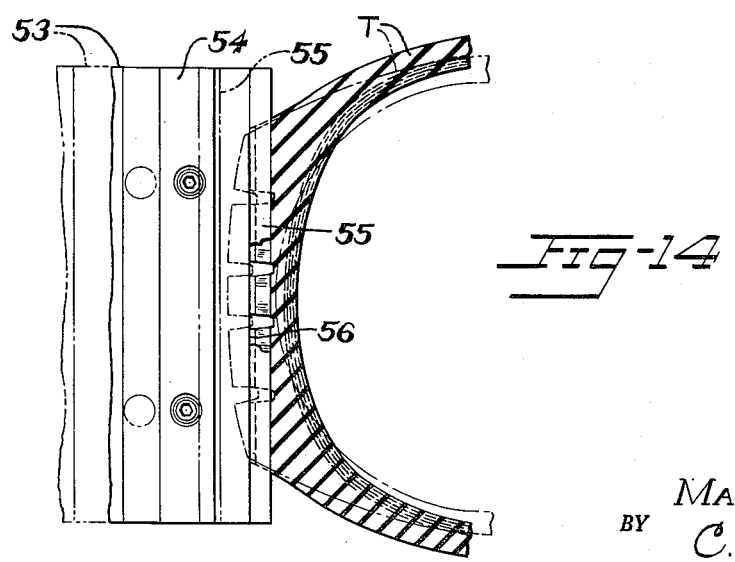

2,762,431

METHOD AND APPARATUS FOR SLITTING TIRE TREADS

Mathew Kuts, Akron, Ohio, assignor to The B. F. Goodrich Company, New York, N. Y., a corporation of New York Application April 30, 1954, Serial No. 426,880

16 Claims. (Cl. 164—10.2)

This invention relates to a method and apparatus for slitting or crosscutting the threads of vehicle tires by a shearing or stabbing operation as distinguished from grooving, effected by rotary milling cutters, or the molding of interruptions in the tread pattern during the curing operation.

It is now well established that wear and antiskid characteristics of vehicle tire treads are improved by crosscutting or transversely slitting the tread elements after curing. Moreover, the degree of improvement of these characteristics is increased and noise of the tread on the road is reduced by making the pitch or distance between the cuts small as, for example, in the order of $\frac{1}{16}''$. Also, the depth of these cuts should be substantially uniform and the edges thereof should not be ragged or irregular. Furthermore, appearance is improved if the adjacent cuts be substantially parallel and either regularly spaced or varied by small increments such that the eye does not readily detect the difference in spacing of adjacent cuts or slits.

Methods and apparatus have heretofore been devised to effect crosscutting or slitting of cured tire treads but these have been relatively slow and have not been readily capable of providing a uniform depth of cut across the treads of tires of different sizes, the latter deficiency being due to the differences in transverse curvature of tires of different size. Moreover, the depth of adjacent cuts have not always been substantially uniform nor have the cuts been free of ragged or irregular edges. Furthermore, the spacing and angular relationship of adjacent cuts have frequently been so irregular as to materially detract from the aesthetic appeal of the tread pattern.

The principal object of this invention is to provide an improved method and apparatus for cross-cutting or slitting the tread of vehicle tires characterized by ease and rapidity of operation and the production of clean-edge, regularly-spaced cuts or slits of uniform depth regardless of the width or transverse curvature of the tire tread.

Another object of the invention is the provision of an improved method and apparatus for cross-cutting or slitting the tread of vehicle tires wherein the cuts or slits are effected by knife means reciprocating into and out of the tread transversely thereof during slow rotation of the tire whereby the cuts or slits are rapidly formed with clean edges and with predetermined circumferential spacing.

A feature of the invention is that the tire is inflated during the cutting or slitting operation and the tread of the tire is subjected to a radially inwardly-directed deforming force adjacent the reciprocating knife so that the tread is stretched in the vicinity of the knife edge facilitating cutting thereby and the tread is rendered substantially planar transversely of the tire in the region of the knife so that the depth of penetration of the latter is substantially uniform throughout the entire width of the tread regardless of the size of the tire.

Another object of the invention is to provide an improved apparatus for cross-cutting or slitting the treads of tires by means of a rapidly-reciprocating knife rapidly penetrating the tread of the tire during slow continuous rotation of the latter wherein the knife is automatically moved to and from cutting relationship with the tire in a manner such that the entire circumference of the tire is cut or slit during one complete revolution thereof without a gap or lap of the cuts at the starting and stopping of the cutting, the reciprocating knife preferably being heated to facilitate the cutting operation.

The manner in which these objects and advantages of the invention may be attained will be apparent to those skilled in the art from the following detailed description of a preferred embodiment taken in conjunction with the accompanying drawings, forming a part of this application, and in which:

Fig. 1a is a detached fragmentary plan view of a portion of the air supply to the apparatus shown in Fig. 1;

Fig. 3 is a front elevation of the apparatus shown in Figs. 1 and 2, with parts broken away and others shown in section to more clearly illustrate the knife carriage and reciprocating mechanism;

Fig. 4 is a schematical, developed view of the control and actuating mechanisms of the apparatus illustrating their functional interrelation and operation;

Figs. 5–9 are schematic representations of the relationship of the cam and switch operating means at the end and beginning of a cutting cycle with the cuts which have been made in the tread indicated by solid radial lines and the cuts to be made indicated by broken radial lines;

Figure 1:
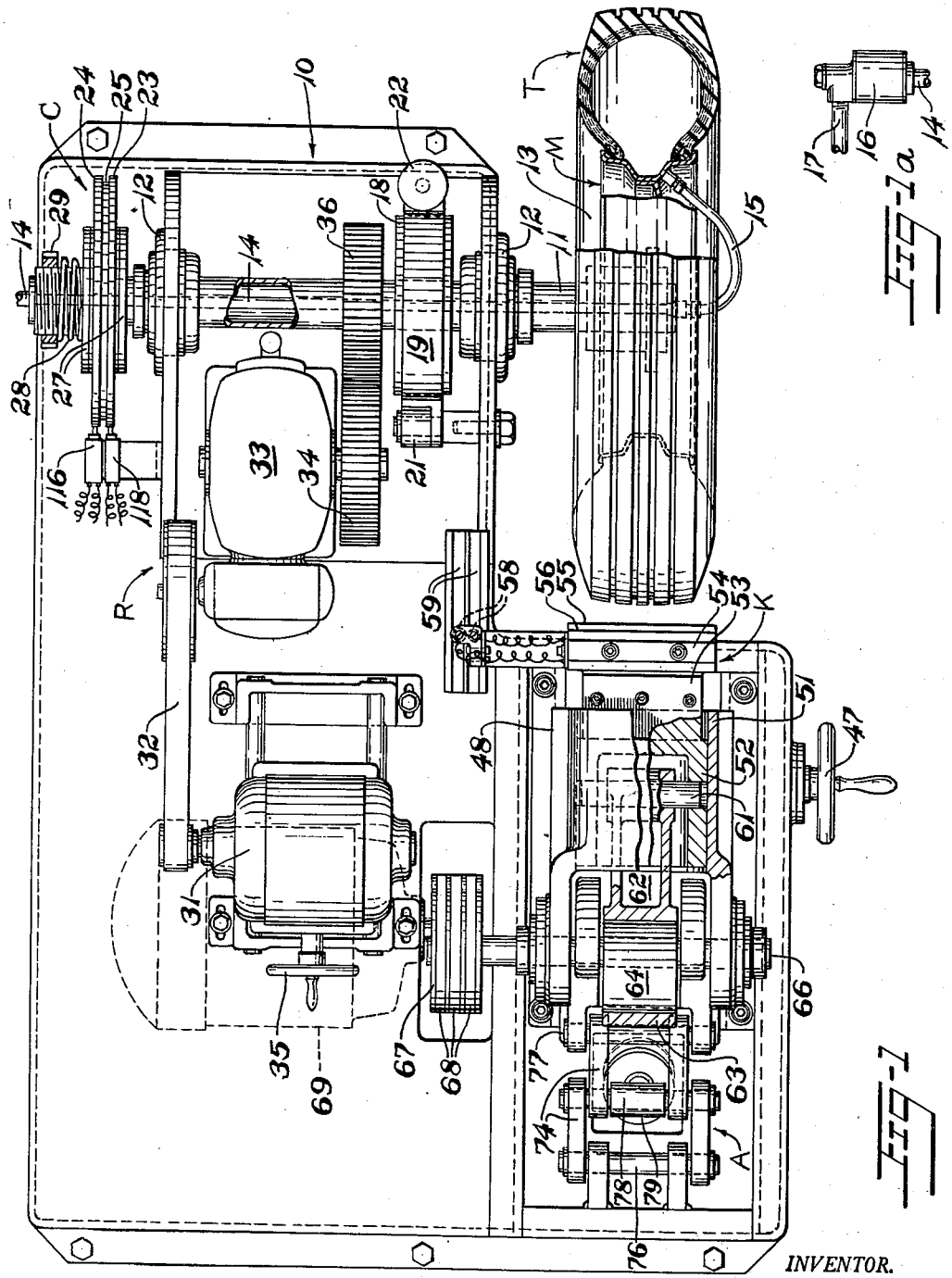
Fig. 1 is a plan view of the presently preferred form of an apparatus capable of performing the novel method and embodying the principles of this invention.

Figs. 10–13 are fragmentary schematic representations of the actions of the knife and knife holder during a single cutting operation, the knife and holder being viewed from the side and the tire being represented in section; and Fig. 14 is a view taken substantially on the line 14—14 of Fig. 13 illustrating the normal configuration of the tire in broken lines and the deflected configuration in solid lines, a portion of the knife being broken away to show the cut or slit formed thereby.

*The method and general principles of operation of the apparatus*

In accordance with this invention, transversely extending cuts or slits are made in the cured tread of a vehicle tire by an elongated knife which is rapidly reciprocated into and out of the tread substantially radially thereof while the tire is slowly rotated about its axis. The rate of reciprocation is so correlated with the speed of rotation that the spacing between adjacent successive cuts is small, preferably in the order of $\frac{1}{16}''$ or less. Moreover, the rate of reciprocation of the knife is such that the tread is deflected or "dimpled" adjacent the edge of the knife blade as the latter enters the tread so that the tread stock is stretched, see Figs. 11–13. This stretching is further accentuated by applying a force directed radially inwardly of the tire adjacent the knife during penetration of the latter into the tread. Preferably, this force is applied by the planar face of the knife holder so that the tire tread is deformed and its outer surface rendered substantially planar in the region of the knife as is shown in Figs. 13 and 14.

As a result of this deformation of the tread and the slow rotation of the tire during the cutting operation, there is a small relative movement of the material of the tread lengthwise and transversely of the knife edge thereby facilitating the shearing or cutting action of the knife so that clean sharp-edged cuts are made. Moreover, rendering the outer surface of the tread substantially planar in the region of the knife insures uniform depth of penetration of the knife throughout the width of the tread regardless of the degree of normal curvature thereof. Hence, it is possible to employ a single straight-edged knife for tires of different tread widths and curvatures and it is no longer necessary to provide a cutting edge conforming in curvature to that of the tire. The cutting operation is preferably effected while the tire is inflated so that the aforementioned dimpling by the knife and deflection by the radially directed force applied adjacent thereto are accentuated. Also, it is preferable to begin rotation of the tire and reciprocation of the knife before the latter is engaged with the tire and to terminate engagement of the knife with the tire exactly after one complete rotation thereof so that the cuts are uniform in character and there is no lap or gap of the cuts at the location of starting and stopping the cutting operation. The presently preferred form of an apparatus embodying the principles of this invention is illustrated in Figs. 1–4 of the drawings and is hereinafter described in detail.

The structure of the apparatus

Figure 2:
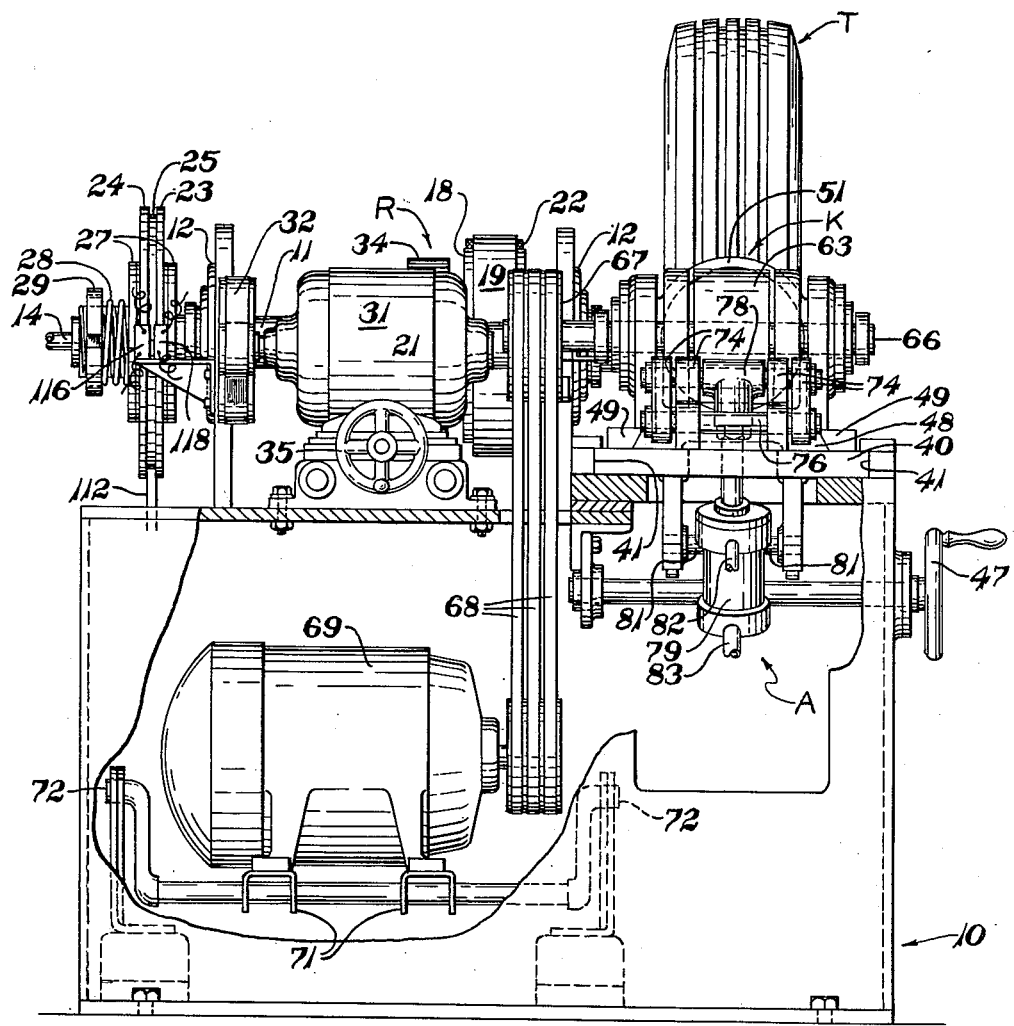
Fig. 2 is an end elevation of the apparatus, as seen from the left side of Fig. 1, with certain parts broken away and others shown in section.

Referring now to Figs. 1–3 of the drawings, it will be seen that the machine comprises a frame 10, preferably formed of welded angles and plates, which supports all parts of the mechanism so that the latter is a compact unitary structure. Expressed in broad terms of function, the machine includes a tire mounting assembly M upon which the tire T to be slit is supported. The tire and its mounting are rotated by a drive assembly R and, during the rotation, the cuts or slits in the tire tread are produced by a reciprocating knife assembly K which is advanced to and retracted from operative relationship with the tire by a knife positioning assembly A in response to electrical signals indicative of tire rotation which are provided by a control cam and switch assembly C.

The tire supporting and mounting mechanism M comprises a hollow shaft 11 which is rotatably journaled in bearings 12 provided in spaced upstanding portions of the frame 10. The forward end of the shaft 11 has a wheel and rim assembly 13 removably connected thereto by the usual hub with spaced bolts and nuts such as is employed for mounting wheels on vehicles. The wheel and rim assembly 13 may be of any desired construction which permits ready mounting and removal of tires. By way of example, one type of wheel assembly which may be employed for tires of the size utilized on passenger cars or small trucks comprises a drop center rim with the outermost flange reduced slightly in diameter to permit easy passage of the tire beads, this outer flange being of sufficient height, however, to retain the adjacent bead when the tire is inflated. The size of the wheel and rim assembly 13 is appropriate to the dimensions of the tire to be cut, the assembly being changed whenever the size of the tires operated upon is changed. This is permitted by the nut and bolt mounting provided for the wheel assembly which mounting also permits the wheel and rim assembly 13 to be replaced by a vehicle wheel with tire mounted thereon if it be desired to crosscut or slit the tread of a tire that has already been mounted.

The machine also includes means to inflate the tire T while it is mounted upon the wheel assembly 13. In the illustrated embodiment, this comprises a pipe 14 which extends through the hollow shaft 11 and has its forward end in the form of a flexible extension 15 with the outer end of the latter in communication with the interior of the tire. As here shown, the tire T has no innertube and hence is inflated by applying air pressure directly within the casing. Consequently, the rim is provided with a threaded valve stem or nipple to which the extension 15 is detachably connected by a conventional rotatable threaded sleeve on the end of the extension. However, should the tire to be cut require a tube for inflation, or if the tire be already mounted, the valve core in the valve for such tire is removed before connecting the extension 15 thereto. In the event the machine is frequently employed to cut mounted tires or is otherwise utilized in a manner requiring frequent changing of the wheel assembly 13, the threaded sleeve on the end of the air line extension can be replaced by a conventional readily detachable connection for cooperation with the tire or tube valve.

The end of the pipe 14 opposite the extension 15 extends beyond the rear end of the shaft 11 and into a rotary joint 16, see Fig 1a, to which air is conducted from a suitable source of supply by a pipe 17. As hereinafter described, the supply of air to the tire T is so controlled that the cutting operation can not be initiated until after the pressure within the tire has reached a predetermined value.

The shaft 11 upon which the tire is supported is provided with a brake drum 18 with which brake shoes or bands 19 cooperate to prevent irregularities in rotation due to tolerances or "play" in the driving mechanism. As here shown, the drum 18 is splined or otherwise connected to the shaft 11 and one end of each of the brake bands or shoes is pivotally mounted to the frame as indicated at 21, see Fig. 3, the extent of the braking action being controlled by a manually adjustable nut on a stud and spring assembly 22 which connects the other ends of the bands or shoes 19.

Supported upon the rotatable shaft 11 rearwardly of the brake are discs 23, 24 and 25, see Figs. 1 and 2. These discs are integral or are interconnected as a unitary structure and are free upon the shaft 11 so that there can be relative rotation therebetween. However, the discs are selectively frictionally clutched to the shaft for rotation therewith. This is effected by mounting the discs between friction members 27 which are rotatable with the shaft, the rearwardmost disc 27 being splined thereon and urged towards the forward disc 27 by a spring 28 acting between the rear disc 27 and an adjustable nut 29 that is threaded upon the shaft assembly. It will be evident from this construction that the discs 23, 24 and 25 will normally rotate with the shaft 11 but can be held stationary while the shaft is rotating. These discs 23 and 24 have their periphery provided with cam surfaces to constitute control cams for governing operation of the apparatus and the disc 25 is provided with a notch for reception of a retractible latch as will be hereinafter apparent.

The assembly R for rotating the tire and its mounting comprises an electrical motor 31, the shaft of which is connected by a belt 32 to the input of a gear reduction unit 33. The output shaft of the unit 33 is provided with a gear 34 that meshes with a gear 36 splined or keyed to the shaft 11. Preferably, the assembly R includes means for varying the speed of rotation of shaft 11. This may be effected by employing a speed control for the motor 31, a variable diameter pulley or pulleys for the belt 32, or variable speed reduction mechanism 33 may be of the variable type as is well known in the art. In the illustrated embodiment, the motor 31 is shown as movably supported upon the frame 10 and a hand wheel 35 is provided for altering the distance between the centers of the motor shaft and the input shaft for the speed reduction unit. This permits the use of a spring loaded variable diameter pulley for the belt 32 to provide the aforementioned adjustability of speed for the shaft 11. However, it will be apparent that any of the other mentioned speed variation means may be employed.

The tread cutting knife and its reciprocating mechanism K together with the knife positioning assembly A are mounted upon a plate 40 which is slidably supported in ways 41 on the frame 10 for adjustment radially of the periphery of the tire T mounted on the shaft 11. This adjustment is effected by means of a screw 42 which is rotatably supported in the frame 10, see Fig. 3, and threads into a nut 43 attached to a depending portion of the plate 40. The screw 42 is rotated by means of a worm wheel 44 splined on the non-threaded portion of the screw, this wheel meshing with a worm 46 that is turned by a hand wheel 47 rotatably mounted upon the forward portion of the frame 10. This adjustment of the mechanism K and assembly A readily adjusts the machine for operation on tires of different diameters and also permits adjustment of the depth of tread cutting or slitting.

The reciprocating portion of the knife assembly K is mounted upon a base or carriage 48 which is slidably guided upon the upper surface of the plate 40 by means of beveled ways 49. The base or carriage 48 is provided with a portion having a cylindrical bore 51 providing a slide guide for a piston-like crosshead 52 which has a reciprocating movement radially relative to the tire T mounted on the shaft 11. The forward portion of the crosshead 52 has a diametrically extending, forwardly projecting web or strut which constitutes a mounting bracket for a knife holder 53. As here shown, the forward portion of this web or strut is split and provided with a transversely extending dovetail recess forming clamping jaws for the dovetail shaped rear portion of the knife holder 53, the latter being clamped in position by a screw which contracts the jaws of the mounting bracket as is well known in the machine tool art.

The knife bracket 53 is provided with a removable jaw 54 which is detachably secured to the bracket and clamps a knife 55 therebetween. The forward faces 56 of the bracket 53 and the jaw 54 are preferably coplanar and of a length to extend transversely the entire width of a tire tread for purposes hereinafter described. The knife 55 has a straight line cutting edge when viewed in top elevation when the cuts or slits are to be continuous the entire distance across the tread elements. However, should it be desired to provide non-continuous, stab-like slits or cuts the knife edge may be made discontinuous. Nevertheless, the cutting edges of such a blade will still lie in a straight line when viewed in top elevation.

It has been found that for most compounds employed in tire treads the knife 55 should be heated. Therefore, the apparatus includes electrical heating elements 57 which are embedded in transversely extending bores in the knife mounting bracket 53. These heating elements are connected to a suitable source of electrical energy, the connection being here shown as including brushes 58 which are slidable upon bus bars 59 supported upon the frame 10 adjacent the knife assembly K, see Fig. 1. The bus bars 59 are connected to an electrical circuit as schematically represented in Fig. 4 further described in conjunction with a description of the controls for the machine.

The crosshead 52 has a transversely extending pin 61 which is pivotally received in a bearing at one end of a connecting rod 62, see Fig. 3. The other end of the rod 62 has an enlarged bore 63 which surrounds an eccentric 64 that is keyed to a drive shaft 66. This shaft is rotatably supported upon the base or carriage 48 and has a multiple groove pulley 67 thereon which is connected by a multiple V-belt drive 68 to the pulley of an electric motor 69. The belt drive 68 is maintained in proper tension by the weight of the motor 69 which is mounted on a bracket 71 that is connected off-center to a pivotal support or hanger 72, see Fig. 2.

As mentioned heretofore, the knife supporting and reciprocating mechanism K is movable to and from operative relationship with the tire T through operation of an assembly designated generally A. This enables the knife to be positioned so that it can be reciprocated without effecting tire cutting thereby permitting the knife to be brought to full operating speed before it is engaged with the tire and also permitting termination of the cutting operation even though the knife is still reciprocated. In the illustrated embodiment of the apparatus the assembly A comprises a toggle linkage 74 the ends of which are, respectively, pivoted to the base plate 40 by a pin 76 and to the carriage 48 of the reciprocating mechanism by a pin 77. The toggle is opened and closed by operation of a piston rod assembly 78 which is connected to the pin joining the two links of the toggle linkage, the piston rod extending within an air cylinder 79 which is pivotally supported on the frame 10 by trunnions 81. This cylinder is provided with air supply pipes 82 and 83 which can be selectively employed as air inlet or air exhaust conduits thereby permitting positive operation of the piston rod in either direction. Control of the supply of air to and exhaust from the cylinder is effected by a solenoid operated valve 84 as hereinafter described in conjunction with Fig. 4. It is sufficient for present purposes, however, to note that when air is supplied through the pipe 82 the piston 78 moves inwardly of the cylinder thus extending the toggle 74 and moving the knife assembly K into operative position in which each reciprocation of the knife causes the latter to enter and withdraw from the tread of the tire T. Air supplied through the pipe 83 actuates the piston rod 78 back to the position shown in Fig. 3 thus retracting the knife assembly K to its inoperative position where reciprocation of the knife does not result in contact with or penetration of the tire tread.

*Operation*

The controls for the apparatus can best be understood in conjunction with a description of the operation of the machine through an operative cycle thereof and to facilitate ready comprehension of the interrelationship of the several parts, the controls have been schematically illustrated in Fig. 4 in conjunction with simplified representations of certain parts of the mechanical structure to show the functional relationships. It is to be understood, however, that the control elements do not necessarily occupy the exact positions shown in this figure and that the illustration of valves, switches, relays and the like is diagrammatical in nature and is not intended to show actual physical details which are conventional. Likewise, it is to be understood that, for the sake of clarity, the electrical wiring has been simplified by omitting motor starters, safety overload switches, fuses and other conventional expedients which are well-known and can be readily supplied by those skilled in the art.

In practicing the method of this invention by employing the apparatus here shown, a tire T, the tread of which is to be crosscut or slit, is mounted upon the wheel and rim assembly 13. Should this be the first operation of the day, the operator will then close the main disconnect switch 85 thereby supplying electrical energy to the main wires or leads 86 and 87 of the control circuit by connecting the latter to the power supply lines L1 and L2. He then closes start switch 88. This supplies electrical energy from the wire 86 through the normally closed stop switch 89 and the now closed start switch 88 to and through the coil 90 of a relay, the circuit being completed from the said coil to the wire 87. This energizes the relay thus moving its contacts 90a and 90b to circuit closing position. Closing of the contact 90a provides a holding circuit around the start switch 88 through a circuit including wires 91, 92, the normally closed contact 93a of a relay 93, wires 94 and 95, to and through the now closed contact 90a and the coil 90. Consequently, release of the start switch 88 does not de-energize the relay 90.

The operation of contact 90b to circuit closed position completes a circuit through the latter and a wire 96 to the motor 31, the circuit being completed to the lead or wire 86 so that the motor 31, which effects rotation of the tire, is started and the tire begins to slowly rotate. At the same time electrical power is supplied through the aforementioned holding circuit provided by contact 90a to a wire 97 connected with one terminal of the coil 98 of a solenoid operated air valve 99, the circuit being completed from the other terminal of the coil to the wire or lead 87. The resulting energization of the coil 98 actuates the valve 99 to provide a path therethrough for air under pressure from a source connected to the inlet 100 of the valve to and through the pipe or conduit 17, and the connected pipes 14 and 15, thereby inflating the tire T. The pressure developed in the tire and in the connecting pipes is also applied through a branch pipe 101 to a pressure responsive switch 102. This switch is set to operate at a predetermined pressure and when this pressure has been reached, the contact 102a is closed thereby supplying electrical power therethrough from wire 97 to a wire 103 which is connected with the motor 69, the circuit being completed from the motor to a wire 104 connected to the wire or lead 87. The energization of motor 69 begins reciprocation of the knife but the latter is not yet engaged with the rotating tire since the advancing and retracting mechanism A is maintaining the knife carriage 48 in retracted position due to air being supplied from the inlet 105 of valve 84 through the conduit 83 connected with the bottom of the cylinder 79.

The closing of the pressure operated switch contact 102a also completes a circuit through this contact and wire 103 to the coil of a timer 106. This timer is conventional and comprises mechanism such as a dash-pot 106b or the like causing its contact 106a to be operated to closed position a predetermined time after energization of the timer. When this time interval has elapsed and the contact 106a is closed, a circuit is completed therethrough to the wire 107 with which is connected one terminal of another timer 108, the other terminal of this timer being connected with the wire or lead 87. The timer 108 comprises a contact 108a which is operated immediately upon actuation of the timer and a second contact 108b with which a dash-pot 108c or the like cooperates to prevent operation of the contact until a predetermined time after energization of the timer. Consequently, the energization of the timer 108 completes a circuit from the wire 107 through the contact 108a and through the still closed contact 108b to the coil 109 of a relay, the circuit being completed from the latter through a wire 110 to the wire 87. The energization of coil 109 results in closing of the normally open contact 109a. This completes a circuit through the contact and the coil 111 of a latch operating solenoid energizing the latter thereby retracting the latch pin 112 from the cooperating notch in the disc 25 on shaft 11. Therefore, the discs 23, 24 and 25, which are integral or connected together, are now clutched to the shaft 11 for rotation therewith. A short time after this rotation begins, which time interval approximately equals a rotation in the order of 15° of the discs, the contact 108b opens thus de-energizing the latch relay 111 so that the latch pin 112 rides upon the periphery of the disc 25 for entry into the notch at the end of one complete revolution of the discs which corresponds with one complete revolution of a tire mounted upon the shaft 11.

The aforementioned closing of the contact 106a has also completed a circuit through the latter and through a wire 113 to one terminal of the coil 93 the other terminal of which is connected by a wire 114 to the lead or wire 87. The energization of this relay does not, however, immediately result in opening of the contact 93a since the latter is delayed in operation a predetermined time after energization of the relay by a dash-pot 115 or the like. Meanwhile, the rotation of the disc 24 has resulted in closing of a circuit through a switch contact 116 since the operating member or actuator 117 of this switch rides from a notch in the periphery of the disc 24 up onto the periphery of this disc. Consequently, a bridging circuit is provided around the contact 93a so that when the latter opens the holding circuit for the circuit previously established through the contact 93a is maintained for one revolution of the tire by virtue of the switch 116.

Simultaneously with this actuation of the switch 116 the switch contact 118 is likewise moved to closed position through rotation of the cam disc 23 since the contact 118 has its operating member or actuator 119 riding upon the periphery of disc 23 so that the operating member moves from the notch in the cam disc up onto the raised portion thereof as rotation of the cam disc 23 begins. This closing of the contact 118 completes a circuit through the latter from the wire 107 and a wire 120 to a wire 121 which is connected with one terminal of a coil 122 for a relay, the other terminal of this coil being connected to the control circuit supply wire 87. The resulting energization of coil 122 closes the contacts 122a and 122b. Closing of the contact 122a provides a holding circuit therethrough for the coil 122. Closing the contact 122b provides a circuit through the latter to one terminal of the coil 123 of the solenoid which operates valve 84, the other terminal of this solenoid being connected to the control circuit supply wire 86. Hence, the solenoid 123 is now energized actuating the valve 84 so that air under pressure is now supplied through the pipe 82 to the upper end of the cylinder 79 and the air in the lower end of the cylinder is exhausted through the pipe 83. Consequently, the linkage 74 of the knife advancing mechanism A is straightened and the knife assembly is moved to operative position adjacent the rotating tire so that each reciprocation of the knife effects penetration of the tire tread.

It will be noted that the control mechanism is so designed that rotation of the tire and reciprocation of the knife begin before the knife is moved into operative position with respect to the tire thus insuring that the knife and tire will have reached full speed of operation prior to engagement. Moreover, it will be observed that engagement of the knife with the tire can not be effected until the tire has been inflated to a predetermined value and that when the mechanism A is operated to effect engagement of the knife with the tire the latch 112 is substantially simultaneously released with the result that cutting of the tire tread begins substantially simultaneously with rotation of the cam discs 23, 24 and 25. The knife 55 continues to rapidly reciprocate while the tire rotates slowly thus effecting cutting of the tread until one complete revolution of the tire has been completed.

When this has been achieved, the switch operator 117 again enters the recess in the cam disc 24 so that the contact 116 is moved to open position thereby breaking the circuit therethrough. As a result the previously energized relays and solenoids are de-energized so that the motors 31 and 69 are de-energized and valve 84 returns to its initial position thereby supplying air under pressure to cylinder 79 through the conduit 83 so that the knife is retracted from cutting engagement with the tire. Likewise, the solenoid 98 is de-energized so that the air within the tire can now exhaust through the valve 99. Moreover, as previously mentioned, the latch 112 has been previously freed and is riding upon the periphery of the disc 25 during the operation of the mechanism. Hence, this latch re-enters the notch in the disc 25 upon completion of one full revolution of the tire being cut thereby stopping further rotation of the control cams 23 and 24. This permits the operator to remove the tire without danger of injury from the reciprocating knife even though the latter may move several times due to inertia after withdrawal of the knife carriage from operative position. A new tire may be cut by simply removing the previously cut tire, mounting the new tire and again pressing the start switch 88.

The precision of the control of the machine by virtue of which there is no lap or gap of the cuts produced adjacent the location of starting and stopping the operation will be understood from an inspection of Figs. 5–9 of the drawings which indicate the positions of the cam disc 24 and the switch actuator 117 adjacent the end of one cycle and the beginning of the next. It will be understood that the switches 116 and 118 are preferably both adjustable circumferentially relative to the latch bar or pin 112 to secure the aforementioned relationships of the switch actuators 117 and 119 relative to the switches in the cams. As shown in Fig. 5 the actuator 117 for switch 116 is shown at the position adjacent the cam notch or depression 24a at which time the cutting of the tread is substantially completed as indicated by the solid radial lines. When the position shown in Fig. 6 is reached the switch 116 is at the "signal point" that is, at the point where it operates to break the control circuit. In the position shown in Fig. 7 the "signal has been given," i. e., the switch has operated to initiate retraction of the knife carriage and termination of energization of the rotation motor and the knife reciprocating motor. The switch 116 is so adjusted relative to the cam 24 that the time lag between switch actuation and knife carriage retraction is just sufficient for the knife to complete the last indicated cut in the tire tread without overlapping the first cut made as is indicated in Fig. 8. Upon mounting a new tire and again pressing the start switch 88 a new cycle resumes as indicated in Fig. 8.

As mentioned heretofore, the speed of reciprocation of the knife 55 is of a high order, as for example, in the neighborhood of 800 to 1,000 strokes per minutes while the speed of rotation of the tire is of a low order and is such that the number of slits per inch formed in the tread is in the neighborhood of 16 or more per inch. The speed of rotation of the tire may, however, be varied to provide a different spacing of the slits. It has been found, for example, that the machine will operate satisfactorily at tire rotation speeds such as to form slits spaced as much as ½ inch. The speed of reciprocation should, however, be kept high and preferably in the range stated above which results in the formation of a transverse depression or dimple in the tire tread as the knife penetrates the tread the effect being schematically indicated in Figs. 11–13. As a result, the material of the tread is stretched in the vicinity of the knife.

This stretching of a tread, coupled with the tendency of the tread to move while the knife is penetrating therein due to the continued rotation of the tire, causes small relative movement of the material transversely over the edge of the knife thereby facilitating the shearing action so that the cuts formed in the tread are clean and do not have ragged edges. In addition, this cutting action is further facilitated by radially inwardly deforming the tire tread in the vicinity of the knife during the terminal portion of the cutting stroke of the knife blade, this latter deflection being effected by engagement with the tire tread of the planar forward faces 56 of the knife holding bracket 53 and jaw 54. The mechanism is so adjusted that on each stroke of the knife blade the tread in the vicinity of the knife is deformed until it is substantially planar, as is indicated in Figs. 13 and 14. This provides the aforementioned additional stretching of the tread material and also deflects the latter so there is relative movement longitudinally of the knife blade as well as transversely thereof thus further accentuating the cutting action. More importantly, however, the flattening of the tread, in the manner just mentioned, results in uniform depth of penetration of the knife into the tread at all locations transversely thereof with the result that a straight-edged knife is capable of producing uniform depth cuts throughout the width of a tire tread in spite of the convex curvature of the latter.

As mentioned heretofore, the knife is heated to an elevated temperature. In the preferred embodiment of the apparatus this is effected by employing an electrical heater or heaters 57 in the knife holder which heaters may be connected in the control circuit jaw 54 as, for example, by connecting the bus bars 59 respectively to the control circuit wire 86 and to a thermostatically operated switch 124 with the latter connected to a manual disconnect switch 125 that is, in turn, connected to the control circuit wire 87 by a wire 126. Hence, closing of switch 125 energizes the heater or heaters which maintain the knife 55 at a predetermined temperature through the operation of the thermostatically operated switch 124. This temperature may be varied for different tire tread compounds but should not exceed the curing temperature and preferably should not exceed the boilng point of water, the preferred range of temperature being in the order of 140° to 170° F.

Although the presently preferred construction of an apparatus embodying the invention has been illustrated and described in detail it will be apparent that this is intended only by way of illustration of the principles of the invention and that variations may be made in the mechanisms and constructional features of the apparatus, important features being rapid reciprocation of a heated knife into and out of the tread of an inflated tire while the latter is slowly rotating, the tire tread being rendered substantially planar in the vicinity of the knife upon each reciprocation of the latter.

I claim:

1. The method of slitting the tread of a tire comprising the steps of inflating the tire, rapidly reciprocating a knife mounted in a support bar into and out of the tread at circumferentially spaced increments thereabout, and additionally pressing the tire with the support bar in the direction of reciprocation of said knife, while the latter is within the tread.

2. The method of slitting tire treads comprising the steps of slowly rotating the tire without interruption and rapidly reciprocating a knife substantially radially into and out of the tire tread during said uninterrupted rotation, while maintaining said reciprocating knife in a path of substantially straight line motion.

3. The method of slitting the tread of a tire comprising inflating the tire, effecting a slow continuous rotation of the tire, rapidly reciprocating a knife into and out of the tire tread during said continuous rotation, and applying a radially compressive force to said tread adjacent said knife during the interval when said knife is in the region of its maximum depth of penetration in said tread.

4. The method of slitting a tire tread comprising the steps of rapidly advancing a knife into the tread, engaging the portion of the tire tread at each side of said knife with an abutment moving with the knife with such engagement occurring near the end of the advancing stroke thereby flattening the tread during completion of the advancing stroke of said knife, and rapidly withdrawing said knife from the tread.

5. The method of slitting tire treads comprising the steps of slowly rotating the tire while inflated, rapidly reciprocating a knife, advancing the reciprocating knife substantially radially toward the tire tread until said knife penetrates the tread upon each reciprocation, continuing the said slow rotation of the tire for at least one complete revolution thereof after said advance of said reciprocating knife, and thereafter retracting the reciprocating knife to clear the tire tread.

6. Apparatus for slitting tire treads comprising means adapted to support a tire for rotation about its axis, means connected to said tire supporting means for producing slow continuous rotation of the supported tire, a knife, means for rapidly reciprocating said knife substantially radially of the supported tire, means to move said reciprocating knife to and from a position wherein the said knife enters the tire tread on each reciprocation, and means responsive to rotation of the tire for actuating said knife moving means to position the reciprocating knife out of contact with said tire after a predetermined degree of one complete rotation of the latter.

7. Apparatus for slitting tire treads comprising means adapted to support a tire for rotation about its axis, drive means connected to said tire supporting means and operative to cause a supported tire to continuously rotate for at least one revolution, a carriage movable toward and away from said support, a knife mounted on said carriage for reciprocation relative thereto, driving means connected to said knife for reciprocating the latter relative to said carriage and said tire supporting means, control means for starting said tire support and knife driving means, means connected to said carriage for moving it toward said tire supporting means and to a position wherein said reciprocating knife enters the tire tread on each reciprocation of said knife, and means operating said carriage moving means subsequent to operation of said control means whereby said carriage is moved into cutting position only after said driving means have both attained operating speed.

8. An apparatus as defined in claim 7 and further comprising means responsive to rotation of said tire supporting means for actuating said carriage moving means to withdraw the latter away from the supported tire after one complete rotation of the latter.

9. Apparatus for slitting tire treads comprising means adapted to support a tire for rotation about its axis, drive means connected to said tire supporting means and operative to cause a supported tire to slowly and continuously rotate for at least one revolution; a tread slitting knife, a holder for said knife, and means connected to said knife holder for rapidly reciprocating the latter substantially radially of said tire a distance such that the said knife enters and leaves the tread of the rotating tire upon each reciprocation of the knife, the said knife holder including a portion providing an abutment surface radially spaced from the cutting edge of said knife a distance such that the said abutment surface engages the tread of a supported tire and radially deflects the latter upon each reciprocation of said knife.

10. A tire tread slitting apparatus comprising means to support a tire for rotation about its axis, means to inflate a tire on said support means, means to rotate said tire supporting means, a tire tread slitting knife, means connected with said knife for reciprocating the latter substantially radially of a supported tire, means for initiating operation of said tire support rotating means and said means to inflate a tire mounted thereon, means responsive to establishment of a predetermined pressure in said tire for energizing said knife reciprocating means, and means responsive to rotation of said tire for terminating rotation thereof and reciprocation of said knife after the tire supporting means has made one complete rotation subsequent to energization of said knife reciprocating means.

11. Apparatus for cutting tire treads comprising a frame, means supported by said frame adapted to support and rotate a tire about its axis, a knife, carriage means movable on said frame toward and away from a tire on said support means, means on said carriage supporting said knife for reciprocation relative to said carriage in a direction generally radially of the tire, means connected to said carriage for moving the latter a predetermined fixed distance to selectively position the knife into and out of tire tread cutting relationship, motor means connected to said tire supporting and knife reciprocating means for effecting tire rotation and reciprocation of said knife, means to energize said motor means, means operating said carriage moving means to position the latter in tread cutting position subsequent to energization of said motor means thereby initiating tread cutting by the said reciprocating knife, means responsive to tire rotation rendered operative simultaneous with movement of said carriage to tread cutting position, and means actuated by the last-mentioned means for effecting operation of said carriage moving means to retract the latter from its tread cutting position after a predetermined tire rotation.

12. Apparatus for cutting tire treads comprising a frame, means supported by said frame adapted to support and rotate a tire about its axis, a knife, carriage means movable on said frame toward and away from a tire on said support means, means on said carriage supporting said knife for reciprocation relative to said carriage in a direction generally radially of the tire, means connected to said carriage for moving the latter radially of a supported tire a predetermined fixed distance to selectively position the knife into and out of tire tread cutting relationship, motor means connected to said tire supporting and knife reciprocating means for effecting tire rotation and reciprocation of said knife, means to energize said motor means, means rendering said carriage moving means operative to position the latter in tread cutting position a predetermined time subsequent to energization of said motor means thereby initiating tread cutting by the said reciprocating knife, means responsive to tire rotation rendered operative simultaneous with movement of said carriage to tread cutting position, and means actuated by the last-mentioned means for effecting operation of said carriage moving means to retract the latter from its tread cutting position and stop said motor means after a supported tire has completed one rotation.

13. A tire tread slitting apparatus comprising means to support a tire for rotation about its axis, means to inflate a tire on said support means, means to rotate said tire supporting means, a carriage movable toward and from said tire supporting means substantially radially of the tire supported thereon, a tire tread slitting knife, means supporting said knife on said carriage for reciprocation relative thereto and substantially radial of a supported tire, means connected with said knife support for reciprocating the latter, means for initiating operation of said tire support rotating means and said means to inflate a tire mounted thereon, means responsive to establishment of a predetermined pressure in said tire for energizing said knife reciprocating means, means operated a predetermined time after the said establishment of a predetermined pressure in the supported tire for rendering said carriage moving means effective to move said carriage to a position where said knife penetrates the tire tread upon each reciprocation of the knife, and means responsive to one complete rotation of said tire supporting means subsequent to operation of said carriage moving means to withdraw the latter from the position wherein said knife engages the supported tire.

14. A tire tread slitting apparatus comprising means to support a tire for rotation about its axis, means to inflate a tire on said support means, means to rotate said tire supporting means, a carriage movable toward and from said tire supporting means substantially radially of the tire supported thereon, a tire tread slitting knife, means supporting said knife on said carriage for reciprocation relative thereto and substantially radial of a supported tire, means connected with said knife support for reciprocating the latter, manually actuated means for initiating operation of said tire support rotating means and said means to inflate a tire mounted thereon, means responsive to establishment of a predetermined pressure in said tire for energizing said knife reciprocating means, means operated a predetermined time after the said establishment of a predetermined pressure in the supported tire for rendering said carriage moving means effective to move said carriage to a position where said knife penetrates the tire tread upon each reciprocation of the knife, rotatable means adapted to rotate with said tire supporting means, means operated a predetermined time after establishment of said predetermined pressure in the supported tire for rendering said rotatable means operative for rotation with the tire supporting means, and means responsive to the said rotatable means actuating said carriage moving means to withdraw the latter from the position wherein said knife engages the supported tire after the latter has made one complete revolution.

15. Apparatus for slitting tire treads comprising means adapted to support a tire for rotation about its axis, means connected to said tire supporting means for producing slow continuous rotation of the supported tire, a knife, means mounting said knife for reciprocation toward and away from the tire tread in a plane extending transversely of said tread, driving means connected to said knife mounting means for rapidly reciprocating the latter and said knife, and control means for actuating said knife driving means during operation of said tire support driving means whereby the tread of the tire is transversely slit during rotary movement of the tire, and means engaging the tread of a supported tire adjacent said knife on each reciprocation of the latter and acting to render the outer surface of said tread substantially planar during the time said knife is attaining its maximum depth of penetration of the tread.

16. Apparatus for slitting tire treads comprising means adapted to support a tire for rotation about its axis, tire rotating means connected to said tire supporting means for producing slow continuous rotation of said tire supporting means, a knife, means mounting said knife for reciprocation toward and away from the tire tread in a plane extending transversely of said tread, driving means connected to said knife mounting means for rapidly reciprocating the latter and said knife from a retracted position with the knife clearing the tire to an advanced position with the knife cutting into the tire tread, and control means for initiating continuous rotation of said tire supporting means with said knife in its retracted position, said control means thereupon initiating reciprocation of said knife driving means causing said knife to move into and out of the tire tread during said continuous rotation of said tire supporting means whereby the tread of the tire is transversely slit during said continuous rotation of said tire supporting means.

References Cited in the file of this patent

UNITED STATES PATENTS

| 2,133,438 | Eger | Oct. 18, 1938 |
| 2,180,556 | Sipe | Nov. 21, 1939 |
| 2,269,137 | Wikle | Jan. 6, 1942 |
| 2,273,185 | Engler et al. | Feb. 17, 1942 |
| 2,447,103 | Susen | Aug. 17, 1948 |
| 2,705,999 | Leguillon et al. | Apr. 12, 1955 |

FOREIGN PATENTS

| 800,776 | France | May 11, 1936 |